Dec. 15, 1959    R. A. CAIL    2,917,693

AUTOMATIC MACHINE TOOLS

Filed July 27, 1955    3 Sheets-Sheet 3

Inventor
R. A. Cail
By Hancock Downing Seebold
Attys.

United States Patent Office 2,917,693
Patented Dec. 15, 1959

2,917,693
AUTOMATIC MACHINE TOOLS

Roland Allan Cail, Slough, England, assignor to Electric & Musical Industries Limited, Hayes, Middlesex, England, a company of Great Britain Application July 27, 1955, Serial No. 524,720

Claims priority, application Great Britain July 30, 1954

6 Claims. (Cl. 318—162)

This invention relates to automatic machine tools and relates especially though not exclusively to automatic electronically controlled milling machines.

In co-pending British patent applications Nos. 19,541/54 and 19,542/54 there is described an automatic electronically controlled milling machine in which a workpiece can be milled to a predetermined profile under the control of dimensional instructions relating to successive discrete ordinates on the workpiece. The dimensional instructions represent radii and the ordinates represent angles and the radii are derived from a perforated record, and to provide for a smooth transition from ordinate to ordinate provision is made in the machine for interpolating between the radii recorded for successive ordinates. The output of the interpolating means is employed to drive a servo-motor which controls the separation between the axis of a holder for the milling cutter and the axis of a workcarrier for supporting the workpiece, and the workcarrier is simultaneously rotated at a rate proportional to the rate of derivation of the instruction, assuming a constant ordinate spacing. With such a machine the locus of the axis of the cutter with reference to the axis of the workcarrier will evidently differ from the profile actually cut on account of the finite radius of the cutter and a problem therefore arises in the preparation of the dimensional instructions. It would seem to be natural to calculate as the instruction the radius of the locus at successive ordinates but there is the difficulty that cutters of different radii may be employed in the machine, and even where the nominal radius of the cutter to be used is selected before calculating the dimensions, the actual radius of the cutter may differ sufficiently from its nominal value to introduce an appreciable error in the cutting operation. This is so because milling cutters and similar tools require to be re-ground frequently during their life and as a result their radius may be altered appreciably.

One object of the present invention is to reduce this difficulty.

Another object of the present invention is to provide an automatic machine comprising a tool holder, a work carrier, means for deriving instructions from a record, control means responsive to said instructions for effecting relative displacement between said tool holder and said work carrier, and compensating means for superimposing an additional displacement on said first displacement to take account of a dimension or dimensional error of a tool held by said tool holder.

Another difficulty encountered in an automatic machine, such as described above, using cylindrical co-ordinates and having compensating means according to the invention, is that the displacement requires to have more than one component depending upon the cutting angle.

Another object of the invention is to provide means dependent on the instructions derived from said record for effecting said additional displacement in different co-ordinate directions.

In order that the invention may be clearly understood and readily carried into effect, the invention will be described with reference to the accompanying drawings, in which.

In the machine illustrated in the accompanying drawings, relative displacement between the tool holder and work carrier is automatically controlled in two dimensions, and the control means employs cylindrical co-ordinates. The instructions derived from the record represent radii to which a workpiece has to be cut at successive angular positions. These instructions are applied three at a time in cyclic order to a quadratic interpolating means which, as will appear, sets up ten output signals which represent points on a quadratic curve drawn through the points represented by the three applied instructions. The ten interpolated signals, after further sub-interpolations, are employed to control the relative displacement between the axes of a tool holder and of a workcarrier, whilst relative angular displacement is affected between the tool holder and the work carrier at a rate dependent upon the rate of interpolation.

Figure 1:
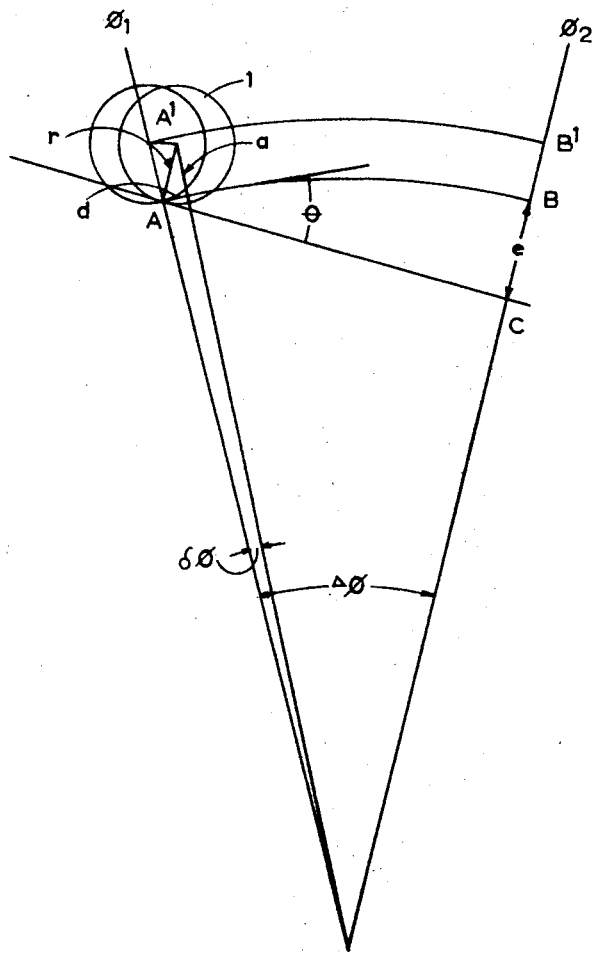
Figure 1 is a diagram explanatory of the present invention.

In Figure 1, $\phi 1$ and $\phi 2$ represent ordinates at which the interpolating means evaluates two successive radii, and AB is the arc (hereinafter denoted by $s$) between these two ordinates, while $e$ is the difference between the radii evaluated for these ordinates. As will appear, $e$ is represented in practice by the differences in the amplitudes of alternating voltages which are set up by the interpolating means to represent the interpolated radii and it will be appreciated that even when the angular spacing $\Delta\phi$ between $\phi 1$ and $\phi 2$ is constant, $e$ will vary in dependence upon the cutting angle, denoted in the drawing by angle $\theta$ and being the angle between the desired cutting line AC and the normal to the radius OA. The outline 1 represents the milling cutter, its axis being normal to the plane of the drawing, and the radius of the cutter is denoted by $r$. If the dimension $e$ is zero, the correct locus for the cutter would be the arc A'B', centered at the axis O of the workcarrier, and the line of cut would be the arc AB. However, the actual instructions derived by interpolation would only represent points on the arc AB and to cause the cutter axis to trace the correct locus AB compensation is required for the radius $r$, and in the case visualised, the compensation to be made is constant and takes the form of an addendum (equal to $r$) to the radius R derived from the interpolator. If however $e$ is not zero, corresponding to a cutting angle $\theta$, the compensation required to produce the correct locus for the cutter axis requires two components. Thus, as shown in the drawing the correct compensation can be achieved by displacing the cutter axis left to right of the corresponding ordinate by a distance $d$, dependent on whether $e$ is negative or positive, and by reducing the addendum to the interpolated radius $a$. In the general case, the following relationships hold $$a = r \cos \theta$$
$$d = r \sin \theta$$

In the example described, the addition of $a$ to the interpolated radius R produces an appropriate increase in the relative displacement between the axes of the tool holder and the worktable whilst the displacement $d$ is produced by a virtual angular displacement $\delta\phi$ between the tool holder and the worktable, where $$R\delta\phi = d$$

In the example described the virtual angular displacement is produced in fact by retarding (or advancing) the interpolating means so that in effect the ordinate OA is displaced. This is tantamount to displacing the record so that the applied instruction relates to an ordinate before or after the ordinate represented by the position of the tool holder relative to the work. For purposes of illustration the angle $\Delta\phi$ is shown relatively large in the drawing, but in practice would be small (of the order of a degree or a fraction of a degree), although in some cases it may vary in dependence upon $e$ as described in co-pending application No. 19,542/54. Therefore, to a first approximation $$\frac{e}{s} = \frac{d}{a}$$

and this equality is employed in evaluating $d$ and $a$.

Figure 2:
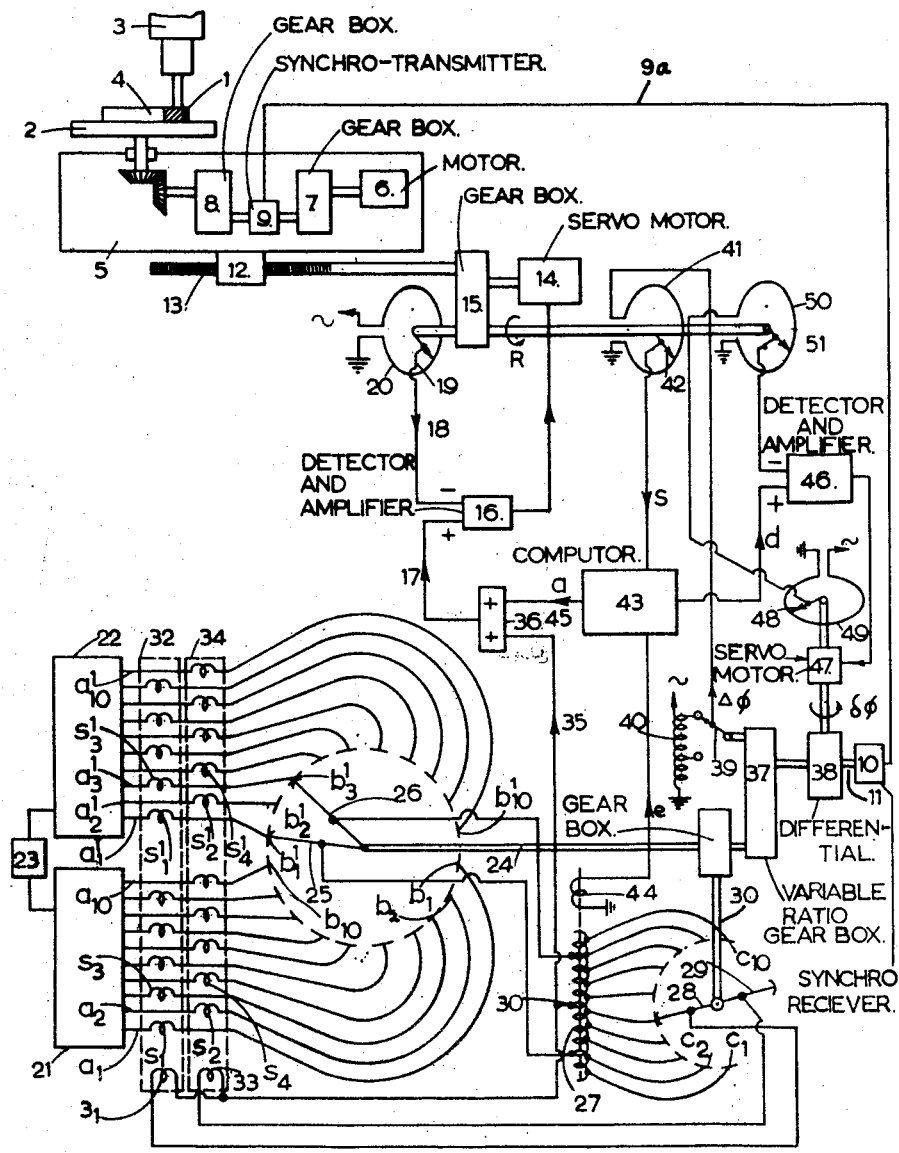
Figure 2 illustrates, partly in block form, one example of an automatic milling machine according to the present invention.

The machine shown in Figure 2 is of the same general construction as the machine described in co-pending patent applications Nos. 19,541/54 and 19,542/54. Parts of the machine which are not relevant to the present invention have however been omitted in order to simplify the description. In Figure 2, reference 2 denotes the work carrier, and the milling cutter 1 is carried by a fixed tool holder 3 and in operation of the machine the cutter 1 is rotated about a vertical axis by any suitable driving means. A workpiece 4 is shown on the table and it will be assumed that the workpiece has to be milled to form a cam of predetermined profile, a small section of which is represented by the line AC in Figure 1. The worktable is rotatably mounted on a platform represented by the outline 5 and it can be driven by an electric motor 6 through the intermediary of two gear boxes 7 and 8. For the purposes of the present invention it will be assumed that, in operation of the machine, the work carrier 2 is rotated at a constant rate, although if desired provision may be made for varying this rate automatically as described in co-pending patent application No. 19,541/54. A synchro-transmitter or magslip transmitter 9 is disposed with its rotor mounted on a shaft between the two gear boxes 7 and 8 so as to be driven away by the motor, and the output of the transmitter 9 is applied by a lead 9a to a synchro or magslip receiver 10 of any suitable known form so as to maintain rotation of a shaft 11 in synchronism with the rotation of the work carrier 2. In practice 9 and 10 may be identical magslip elements. The function of the shaft 11 will be described subsequently. The platform 5 has a nut 12 which is engaged by a lead screw 13. The lead screw 13 is driven by a servo-motor 14 through the intermediary of a gear box 15. The servo-motor 14 derives its input signal from an error detector and amplifier 16 which may also be of known form and which receives one input signal from a lead 17 which represents the required instantaneous displacement between the axes of the cutter 1 and of the work carrier 2, and it receives with opposite polarity a second input signal which is an analogue of the actual displacement between these axes. For simplicity, the analogue is shown as being derived from a tap 19 on a simple potentiometer 20, the tap 19 being carried by a rotatable arm driven by the motor 14 through the gear box 15. In practice a more accurate device for deriving the analogue of the displacement of the table axis with reference to the axis of the cutter 1 will be required and this device may comprise a linear interpolator of the construction described in United States application Serial Number 484,202.

It will be understood that the servo-motor 14 operates to displace the work carrier 2, until equality is obtained between the signals applied to the error detector and amplifier from the leads 17 and 18. The distance between the axis of the cutter 1 of the work carrier 2 will then be a required distance.

References 21 and 22 denote two quadratic interpolators which in operation of the machine produce alternating voltages having amplitudes which are analogues of the radius of the cam at successive closely spaced angular positions, such as $\phi 1$ and $\phi 2$ in Figure 1. The construction of the interpolators 21 and 22 is not relevant to the present invention, but a suitable construction is described in United States application Serial Number 459,814.

The rectangle 23 represents means for deriving signals representing instructions recorded on a record and applying these signals cyclically in groups of three to the terpolators 21 and 22 alternately. The construction of such means also forms no part of the present invention, a suitable construction being described in co-pending patent application No. 19,541/54. It will be assumed that with the machine in the condition represented in the drawing, the interpolator 22 has applied to it three signals representing successive radii derived from the record, these three radii being of course more widely spaced than OA and OC in Figure 1. The interpolator 22 sets up signal representing ten radii interpolated in the range covered by the three radii derived from the record, the range of interpolation extending in fact from mid-way between the first two radii derived from the record to midway between the next two derived radii. The ten interpolated signals which are in the form of alternating voltages having amplitude which are analogues of the interpolated radii, are applied to ten conductors $a_1', a_2' \ldots a_{10}'$, these conductors leading as shown to a series of ten studs $b_1', b_2' \ldots b_{10}'$. The studs $b_1'$ to $b_{10}'$ are arranged in a semi-circle about a shaft 24 which carries two brushes 25 and 26 fixed in relation to each other. The other interpolator 21, like the interpolator 22 has ten output leads, denoted by the references $a_1$ to $a_{10}$ leading to ten studs $b_1$ to $b_{10}$ which, together with the studs $b_1'$, to $b_{10}'$ complete a stud circle. In operation of the machine the shaft 24 is rotated to cause the brushes 25 and 26 to scan the stud circle continuously, the brushes being of the make-before-break type so that each brush picks up an alternating voltage of continuously variable amplitude. The voltages picked up by the respective brushes are applied across an auto-transformer 27 having tappings connected to studs denoted by the references $C_1$ to $C_{10}$. The studs $C_1$ to $C_{10}$ subtend an angle somewhat more than 180° and are scanned alternated by two brushes 28 and 29 which are mounted diametrically opposite each other on a shaft 30. The shaft 30 is geared to the shaft 24 so that it revolves through 180° in the time taken by the brushes 25 and 26 to scan the distance between the centres of adjacent studs on the corresponding stud. The voltage appearing between the midpoint 30 and the brush 28 is applied across a primary winding 31 of an injector denoted in general by the dotted outline 22. In addition to the primary winding 31, the injector comprises a series of secondary windings, each having the same number of turns, connected in series in alternate leads from the interpolators 21 and 22 as shown, these secondary windings being denoted by the references $S_1, S_3 \ldots S'_1, S'_3 \ldots$ The voltage appearing between the brush 29 and the centre point 30 of the auto-transformer 27 is applied across a primary winding 33 of the further injector 34 which is similar to the injector 32 except that the secondary windings are connected in series in those leads which do not have a secondary winding in the injector 32. Secondary windings in the injector 34 are denoted by the references $S_2, S_4, S'_2, S'_4 \ldots$ It will be appreciated that when the brush 28 (or 29) is in the central position with reference to the auto-transformer 27 no voltage it applied to the primary winding of either of the injectors 32 and 34 and it is arranged that the brushes 28 and 29 occupy this position when the brushes 25 and 26 are aligned with the midpoint of studs in their own circle.

For purposes of illustration it will be assumed that the signal applied by the interpolator 22 to the lead $a'_2$ represents the radius OA of Figure 1 whilst the signal applied to the conductor $a'_3$ represents the radius OC. The signal applied to the conductor $a'_1$ represents the radius of the cam at the ordinate preceding $\phi 1$. On this assumption, when the brush 28 is centrally disposed with reference to the auto-transformer 27 no electro-motive force is introduced across the secondary winding of the injectors 32 and 34 and electro-motive forces applied to the brushes. $b'_1$, $b'_2$, $b'_3$ represent the radius at the three ordinates specified. There is therefore setup at the midpoint 30 of the auto-transformer 27 an alternating voltage whose amplitude represents the voltage OA. However, as the shaft 24 rotates, therefore the range of positions in which the brushes 25 and 26 remain in engagement with the studs $b'_1$ and $b'_3$, the brush 28 scans the stud circle $C_1$ to $C_{10}$ and injects a voltage across the primary winding 31 proportional to the displacement from the mid-position. This causes the voltage applied to the studs $B_1$ and $B_3$ to be varied in a linear manner to produce linear subinterpolation between the radii OA and OC. Sub-interpolation is similarly effected between any two radii set up by the quadratic interpolators 21 and 22, the operation of the sub-interpolating means being described in detail in United States application Serial Number 459,814.

The last mentioned application also describes the manner in which the brushes 25 and 26 produce quadratic interpolation in successive ranges defined by the instructions derived from the record, the interpolators 21 and 22 being used alternately. The voltage available at the midpoint of the auto-transformer 27 represents to a high degree of accuracy the required radius of the cam at successive closely spaced points; and this voltage is applied by a lead 35 to an adding circuit 36 having a second input 45 and its output lead being 17. The circuit 36 may be of known form such as a negative feedback amplifier and which is effective to add having respect to sign, voltages applied at its input leads.

The shafts 24 and 30 are coupled through a gear box as shown to a variable speed gear box 37 and a differential gear 38 to the aforesaid shaft 11 which as described above is synchronised by means of 9 and 10 with the rotation of the work carrier 2. Assuming that no relative displacement is introduced between the shafts 24 and 11 by differential gear 38, the synchronisation ensures that the signal applied by 35 to the adding circuit 36 represents the required radius of the cam at the ordinate defined by the line joining the axis of the worktable to the axis of the cutter 1, the workpiece 4 being it is assumed locked to the worktable so as to rotate therewith. The transmission ratio between the worktable 2 and the shaft 24 is determined by the spacing $\Delta \phi$ between successive ordinates and to enable the ordinate spacing to be adjusted, the ratio of the gear box 37 may be varied. For simplicity it will be assumed that it provides two different gear ratios only and it will also be assumed that the required gear ratio is preselected manually, although if desired the gear ratio can be adjusted automatically as described in co-pending patent application No. 19,542/54.

References 39 denote a switch, whose condition is determined by the gear ratio of the gear box 37, so as to select from different taps on a potentiometer 40 a voltage whose amplitude is the analogue of the ordinate spacing $\Delta \phi$. This voltage representing $\Delta \phi$ is applied across a potentiometer 41 which has a tap 42 mounted on the same shaft as the tap 19. The position of the tap 42 therefore is an analogue of the radius R (more correctly, $R+a$) for the instantaneous positions of the worktable, and therefore the resultant voltage derived from the tap 42, which is equal to the product of R and $\Delta \phi$, is an analogue $s$, the length of the arc AB. This forms one input to a computer 43. It will be described in more detail subsequently. The voltage applied across the auto-transformer 27 of the linear sub-interpolator is proportional to $e$ of Figure 1 and a voltage representing $e$ on the appropriate scale is derived from a secondary winding 44 coupled to the auto-transformer 27 and this voltage forms a second input to the computer 43. The computer operates to evaluate from the two inputs provided the quantities of $a$ and $d$ and the output $a$ is applied via lead 45 to the adding circuit 36 where it is added with appropriate polarity to the output of the interpolating means, namely the signal applied via the lead 35. The combined signal which represents $R+a$ forms the input signal to the error detector and amplifier 16 so that the servo-motor 14 serves to produce a displacement between the axes of the cutter 1 and the worktable 2 representing $R+a$ as required. The computer output which is the analogue of $d$ is applied, as one input, to an error detector and amplifying circuit 46. The output of this circuit forms the input of a servo-motor 47 which drives the tap 48 of a potentiometer 49 and also drives the cage of the differential gear 38. The voltage picked up by the tap 48 of the potentiometer 49 is applied across a potentiometer 50, the tap 51 of which is mounted on the shaft of the tap 19, and is thus ganged therewith. The voltage derived from the tap 48 of potentiometer 49 is the analogue of the angular displacement of shaft of the servo-motor 47 and is in effect multiplied by R, in the potentiometer 50. The product is applied with negative polarity as the second input to the error detector and amplifier 46 and the servo-motor 47 operates in known manner to reduce to zero the difference between the two input signals applied to 46. This causes the angular displacement of the shaft of the servo-motor 47 to represent $\delta\phi$, and the differential gear is operated thereby in known manner to advance or retard via the gear box 37 the shaft 24 of the interpolating means by a corresponding amount. This causes a displacement of the brushes 25 and 26 and the work carrier 2, by a distance $\delta\phi$, producing a virtual displacement of the record by the angle $\delta\phi$ as required.

The potentiometers 19, 41, 49 and 50 are each in practice auto-transformers, since in the machines illustrated all voltage analogues are in the form of alternating currents, and the alternating current for energizing the auto-transformers, and also the interpolating means is derived from a common stabilized source. The error detectors and amplifiers 16 and 46, which produce the input signals for servo motors are therefore required to include rectifiers.

The linear sub-interpolating means has been illustrated to show one method of deriving the signal analogous to $e$. Other means may of course be employed.

Figure 3:
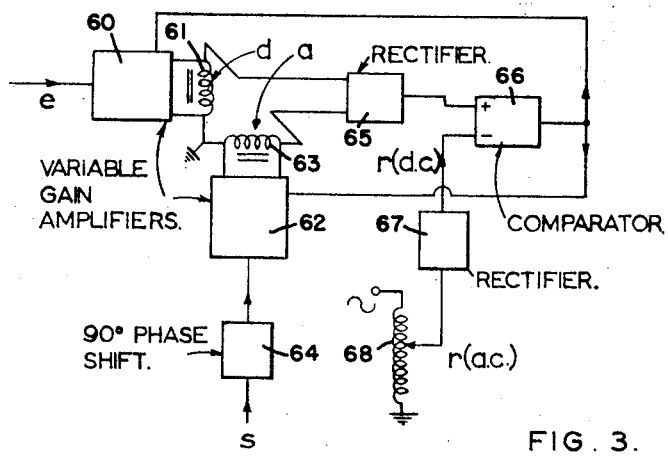
Figure 3 illustrates a computer forming part of the machine illustrated in Figure 2.

The computer 43 may take a variety of forms and one suitable form is illustrated in Figure 3. According to this figure, the voltage analogous to $e$ is applied via a variable gain amplifier 60 across an inductor 61. The voltage analogous to $s$ is similarly applied via a variable gain amplifier 62 to an inductor 63 but is first shifted in phase by 90 degrees in a shift network 64. The inductors 61 and 63 are connected in series and the voltage across the inductors in series is applied to rectifier 65. The unidirectional voltage of the rectifier 65 is proportional to $e+js$ and is fed to a comparator 66 which receives a second input in phase opposition in the form of a unidirectional voltage proportional to $r$, the cutter radius. This last voltage is derived from a rectifier 67, to which is applied an alternating voltage whose amplitude is the analogue of $r$ and is set up manually by a suitably calibrated manually-adjustable potentiometer or autotransformer 68. The output of the comparator 66 is a voltage representing the difference of the applied voltages and it is applied to the amplifiers 60 and 62 where it is effective to vary to the same extent the gain of these amplifiers in such a manner as to tend to reduce the output of the comparator 66 to such a manner as to tend to reduce the output of the comparator 66 to zero. When this condition is achieved the voltage output of the rectifier 65 is the analogue to $r$ and the voltages across inductors 61 and 63 have amplitudes proportional respectively to $d$ and $a$, bearing in mind the aforesaid equality between $e/s$ and $d/a$. Output signals analogous to $d$ and $a$ can therefore be derived from the amplifiers 60 and 62.

The computer shown in Figure 3 theoretically requires that the amplifiers should have equal gains. If the accuracy demanded is greater than can be achieved with the use of amplifiers, on account of the difficulty of maintaining equality of gains, the amplifiers 60 and 62 may be replaced by ganged potentiometers driven by a servo motor the input signal to which is the output of the comparator 34.

Figure 4:
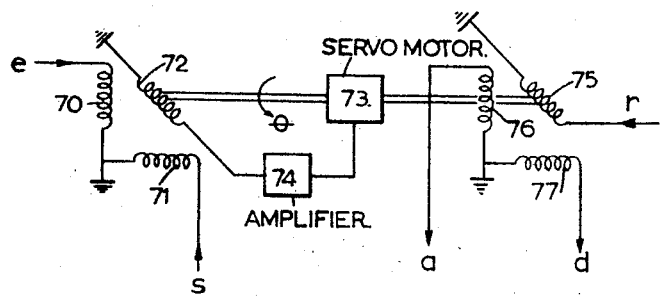
Figure 4 illustrates a modification of Figure 3.

An alternative and preferred form of computer is shown in Figure 4. This computer comprises a resolver having two stator windings 70 and 71 and a rotor winding 72 mounted on the shaft of a servo motor 73, the stator windings 70 and 71 having their magnetic axis mutually at right angles. The input signal for the servo motor 73 is derived from an amplifier 74 which amplifies the voltage set up across the rotor winding 72. The alternating voltages which are analogues of $e$ and $s$ are applied respectively to the stator windings 70 and 71 with such polarity that the voltage picked up by the rotor winding 72 is equal to $e \cos \theta - s \sin \theta$ where $\theta$ is the angular displacement of the rotor winding 72 from the position of maximum coupling with the winding 70. The servo-motor rotates the rotor winding to reduce the voltage picked up to zero, and when this condition prevails $\theta$ is equal to the cutting angle of the machine. The servo motor 73 also drives the rotor winding 75 of a second resolver having stator windings 76 and 77. The rotor winding 75 has applied to it an alternating voltage which is the analogue of $r$ and therefore, assuming the shaft angular displacement equals the cutting angle, the voltages picked up by the windings 76 and 77 are the required analogues of $a$ and $d$.

A machine according to the invention can be used not only for making full compensation for the radius of the cutter but can be also used in cases where the recorded instructions include an allowance for the cutter radius. In such an application of the invention the voltage which is set up by the potentiometer 68, or which is applied to the winding 75 is required to represent not the radius of the cutter, but the difference between the actual radius of the cutter and the radius allowed for in the preparation of the instructions. In general this difference will be negative and suitable provision will be necessary for the setting up of the required negative signal.

Moreover the invention has been described on the assumption that the instructions derived from the record relate only to discrete ordinates on the workpiece. The invention is however applicable to machines in which the instructions are derived from a continuous record, in which case interpolating means are unnecessary. The continuous record may for example be in the form of a prototype, the instructions being derived in this case by sensing the dimensions of the prototype, and the present invention can then be utilised for compensating for differences in dimensions between the sensing element and the cutter or other tool used in the machine.

The invention can also be applied to machines of the kind described in co-pending patent application No. 12,103/55 in which both radius and the angle are separately interpolated as functions of a common independent variable, for example time or ordinate numbers. In this application of the invention the voltages which are analogues of $e$ and $s$ can be derived from the respective interpolators, for example in the manner shown for the voltage representing $e$, and the computed voltages representing $a$ and $d$ could be injected in the manner shown in the voltage $a$ in Figure 2 of the drawing. The switch 39, the potentiometers 40 and 41, the differential gear 48 and the control means therefor would not be required.

The present invention can also be applied to a machine which is controlled in three dimensions, two successive resolutions being made to derive the compensations required in the three co-ordinate directions. The invention is moreover not confined to machines which employ cylindrical ordinates and may be applied to machines employing other ordinate systems.

The axis of the cutter 1 need not be fixed but may be movable to produce one or more of the co-ordinate displacements, in response to the instructions derived from the record. Furthermore, the compensation $d$ can be achieved by a displacement of the worktable 2 or of the cutter 1 if desired, instead of a displacement of the interpolating means.

The invention is also applicable to machines for shaping workpieces otherwise than by milling them.

What I claim is:

1. A control mechanism suitable for automatic machine tools, comprising means for reading a record, means responsive to said record-reading means for deriving control signals defining a first locus, means for setting up a compensating signal, means responsive to said compensating signal for modifying said control signals to define a second locus being the locus of the centre of a circle rolling on said first locus and having a radius represented by said compensating signal.

2. A control mechanism according to claim 1 wherein said means for deriving control signals comprises means for setting up representations of one co-ordinate of a series of points along said first locus and means for setting up representations of another co-ordinate of said points, and said means for modifying said control signals comprises means for deriving from said representations representations of the normal to said first locus at said points, means for resolving a vector along said normal and having a magnitude represented by said compensating signal, to derive representations of the components of said vector in the direction of said co-ordinates, and means for adding said component representations to said co-ordinate representations to derive said modified control signals.

3. A control mechanism according to claim 2, said means for setting up a representation of one co-ordinate comprising means for determining a rate of operation of said record reading means, said means for setting up a representation of the other co-ordinate comprising means for setting up an analogue signal in response to an output of said record reading means, said modifying means being arranged to add one of said component representations to said analogue signal and to produce a virtual displacement of the record in response to said other component representation, thereby to add the other component representation to the respective co-ordinate representation.

4. A control mechanism according to claim 3, wherein said means for deriving said analogue signal comprises interpolating means for interpolating between spaced instructions derived from said record reading means and a series of switch elements to which output signals from said interpolating means are applied, and brush means for scanning said elements at a rate dependent upon said rate of operation of the record reading means; said modifying means being arranged to displace said brush means to produce said virtual displacement of said record.

5. A control mechanism according to claim 2, said means for deriving a representation of said normal being responsive to the difference between signals applied to said switch elements, a transformer having a primary winding and two secondary windings, said secondary windings having their magnetic axes mutually perpendicular, means for angularly displacing the magnetic axis of said primary winding in the plane of said magnetic axes into a direction representing the direction of said normal, and means for injecting said compensating signal into said primary winding to produce said resolved components across said secondary windings.

6. A control mechanism according to claim 2, said resolving means comprising a means for injecting a signal representing an angle into a resolver and means for deriving signals proportional to the sine and cosine of said angle from said resolver.

References Cited in the file of this patent

UNITED STATES PATENTS

| | | |
|---|---|---|
| 2,537,427 | Seid et al. | Jan. 9, 1951 |
| 2,628,537 | Neergaard | Feb. 17, 1953 |
| 2,685,054 | Brenner et al. | July 27, 1954 |
| 2,710,934 | Senn | June 14, 1955 |

OTHER REFERENCES

Report entitled "A Numerically Controlled Milling Machine," published by Servomechanisms Laboratory, Massachusetts Institute of Technology, May 31, 1953, 259 pages.